(12) United States Patent
Ramachandra et al.

(10) Patent No.: US 11,586,551 B2
(45) Date of Patent: Feb. 21, 2023

(54) STORAGE ARRAY INVALIDATION MAINTENANCE

(71) Applicant: Apple Inc., Cupertino, CA (US)

(72) Inventors: Sreevathsa Ramachandra, Austin, TX (US); Christopher L. Colletti, Austin, TX (US); David E. Kroesche, Austin, TX (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 17/008,491

(22) Filed: Aug. 31, 2020

(65) Prior Publication Data
US 2022/0066941 A1 Mar. 3, 2022

(51) Int. Cl.
*G06F 12/0891* (2016.01)
*G06F 12/1027* (2016.01)
*G06F 12/0875* (2016.01)

(52) U.S. Cl.
CPC ...... *G06F 12/0891* (2013.01); *G06F 12/0875* (2013.01); *G06F 12/1027* (2013.01); *G06F 2212/1044* (2013.01); *G06F 2212/683* (2013.01)

(58) Field of Classification Search
CPC ............ G06F 12/0891; G06F 12/0875; G06F 12/1027; G06F 2212/1044; G06F 2212/683
See application file for complete search history.

(56) References Cited

U.S. PATENT DOCUMENTS

| 5,689,680 | A | * | 11/1997 | Whittaker | G06F 12/0808 365/189.02 |
| 5,737,756 | A | * | 4/1998 | White | G06F 12/0831 711/118 |
| 8,321,614 | B2 | | 11/2012 | Wolfe | |
| 8,738,860 | B1 | * | 5/2014 | Griffin | G06F 12/0897 711/122 |
| 8,904,073 | B2 | | 12/2014 | Kaushikkar | |
| 9,792,112 | B2 | | 10/2017 | Henry et al. | |
| 10,318,297 | B2 | | 6/2019 | Ge et al. | |
| 2005/0044448 | A1 | * | 2/2005 | Verdun | G06F 12/0835 714/22 |
| 2014/0095801 | A1 | * | 4/2014 | Bodas | G06F 12/0891 711/135 |
| 2019/0129853 | A1 | * | 5/2019 | Walker | G06F 12/128 |

* cited by examiner

*Primary Examiner* — Michael Krofcheck
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to managing storage array invalidations. A computer system may comprise a processor core configured to operate in an idle state and operate in a run state in which the processor core executes instructions. The computer system may further comprise a power management circuit that is configured to receive, while the processor core is in the idle state, a set of invalidation requests directed to the processor core to invalidate a set of entries of a storage array of the processor core. The power management circuit may store invalidation information indicative of the set of invalidation requests. The power management circuit may determine that the processor core has received a request to transition to the run state. Prior to the processor core operating in the run state, the power management circuit may invalidate the set of entries of the storage array based on the invalidation information.

19 Claims, 9 Drawing Sheets

STORAGE ARRAY INVALIDATION MAINTENANCE

BACKGROUND

Technical Field

This disclosure relates generally to computer systems and, more specifically, to managing storage array invalidations (e.g., cache invalidations).

Description of the Related Art

Modern computer systems usually include a processing unit having multiple processor cores that can individually execute program instructions retrieved from memory. To improve the operating speed of a processor core, the processor core often includes an instruction cache that stores program instructions that the processor core can quickly access and execute at the appropriate time. Over time, as applications are executed, program instructions are invalidated and removed from the instruction cache to make room for other program instructions requested by the processor core. Additionally, instructions are invalidated in the instruction cache when the page containing the instructions is remapped to other instructions/data or the instructions in the page are modified. A processor core also utilizes other mechanisms to improve its operating speed, such as a translation lookaside buffer (TLB) that can store a set of translations between virtual memory addresses and physical memory addresses. Similar to the instruction cache, over time, translations stored in the TLB are invalidated and removed to make room for other translations. Additionally, the translations are invalidated when the translation is removed from an underlying data structure (e.g. page tables) because the page has been remapped.

SUMMARY

Various embodiments for managing storage array invalidations are disclosed. Broadly speaking, a processor core includes a storage array (e.g., an instruction cache, a TLB, etc.) having entries for storing information. The processor core may be transitioned from a run state to an idle state in preparation for power gating the processor core. While the processor core is in the idle state, a power management circuit may receive a set of invalidation requests directed to the processor core for invalidating a set of entries of the storage array. The power management circuit may store invalidation information (e.g., memory addresses) about the set of received invalidation requests. The power management circuit may determine that the processor core has received a request to transition to the run state. Prior to the processor core operating in the run state, the power management circuit may invalidate the set of entries of the storage array based on the invalidation information. In some cases, if the power management circuit does not have sufficient capacity to store information for all invalidation requests that are received, then the power management circuit may invalidate all entries of the storage array prior to the processor core operating in the run state.

DETAILED DESCRIPTION

Figure 1:
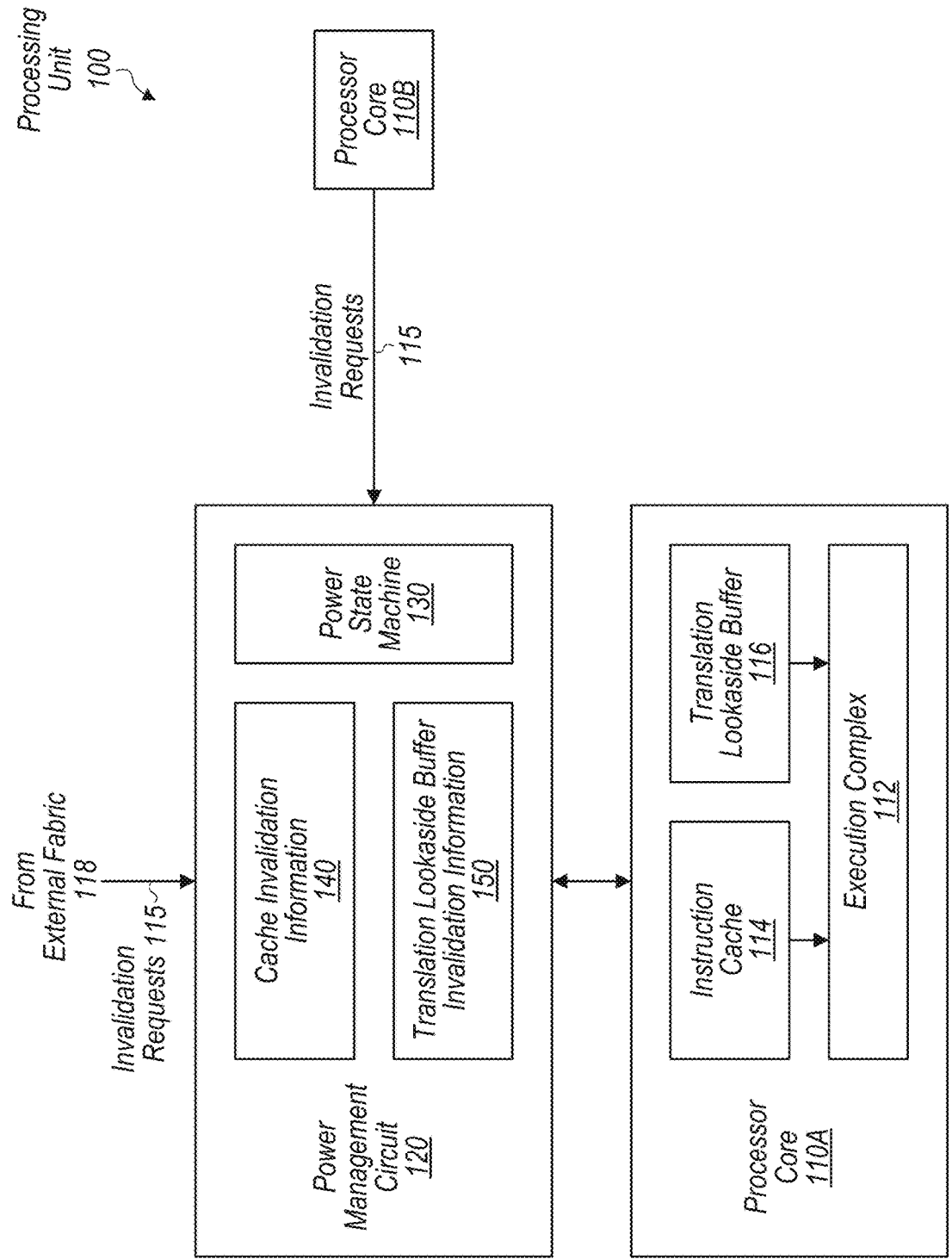
FIG. 1 is a block diagram illustrating example elements of a processing unit having a set of processor cores and a power management circuit, according to some embodiments.

As explained above, modern computer systems often include a multi-core processing unit. In order to reduce the power consumption of the processing unit, the processing unit can include a power management circuit that can independently power gate (e.g., reduce or shut off power to blocks of a circuit) the individual processor cores. As an example, if a processor core is not performing work or is not expected to perform work in the near future, the processor core can be power gated to conserve power. In prior approaches, before power gating a processor core, cache invalidation requests issued from other processor cores to the former processor core that target the processor core's instruction cache or TLB are blocked and the information stored in the instruction cache and the TLB is completely invalidated. In various cases, however, before the processor core is power gated, it may receive an interrupt that causes the processor core to resume performing work without actually being power gated. But since the instruction cache and the TLB were completely invalidated, the processor core experiences increased resumption latency as it spends time reloading information into the instruction cache and the TLB.

The present disclosure describes various techniques for tracking, while a processor core is in a blocked state (e.g., an idle state or a powered-off state), invalidation requests directed to the processor core for invalidating entries of the processor core's instruction cache and TLB. Using information stored about the invalidation requests, only a subset of the instruction cache and TLB entries may be invalidated as opposed to all entries before the processor core resumes normal program instruction execution. While the various techniques of this present disclosure are discussed with respect to an instruction cache and a TLB, these techniques can be applied to other storage arrays, such as a data cache.

In various embodiments that are described below, a power management circuit includes a power state machine that is configured to transition a processor core through various states (e.g., idle state, run state, etc.), and a storage module for tracking invalidation requests that are issued to the processor core while the core is in a blocked state. During operation, the power management circuit may transition the processor core into a blocked state (e.g., after detecting the execution of an idle initiating instruction). While the processor core is in the blocked state, the power management circuit may receive invalidation requests directed to the processor core for invalidating entries of the core's instruction cache and TLB. In various embodiments, the power management circuit maintains, in the storage module (e.g., a set of address buffers), invalidation information (e.g., a set of memory addresses) that is derived from the invalidation requests. Before the processor core operates in a run state in which the processor core executes program instructions, the power management circuit may access the invalidation information and remove the affected entries from the corresponding instruction cache and TLB. In some cases, if the number of invalidation requests exceeds the storage capacity of the storage module (as may be tracked by counters), then an overflow indicator may be set, resulting in all entries of the instruction cache and/or the TLB being invalidated before the processor core operates in the run state.

These techniques may be advantageous over prior approaches, in some embodiments, as these techniques allow for a subset of entries of a processor core's instruction cache and TLB to be invalidated instead of all entries before a processor resumes normal execution. Accordingly, because the processor core is not rebuilding the entire instruction cache and TLB as it resumes normal execution, the processor core does not experience as long of a resumption latency as prior approaches. As a further result, power gating a processor core in order to reduce power consumption becomes a less costly endeavor with the shorter resumption latency. Also, since the processor core is not always having to rebuild the entire instruction cache and TLB under these techniques, power cost are reduced. An exemplary application of these techniques will now be discussed, starting with reference to FIG. 1.

Turning now to FIG. 1, a block diagram of a processing unit 100 is shown. Processing unit 100 includes a set of components that may be implemented via hardware or a combination of hardware and software routines. In the illustrated embodiment, processing unit 100 includes processor cores 110A and 110B and a power management circuit 120. As illustrated, processor core 110A includes an execution complex 112, an instruction cache 114, and a translation lookaside buffer (TLB) 116—while not shown, processor core 110B may include its own set of these components. While instruction cache 114 and TLB 116 are specifically illustrated and discussed, these components are examples of the more general category of storage arrays. The techniques of the present disclosure can be applied to other storage arrays, such as a data cache, and are not limited to instruction cache 114 and TLB 116. As further illustrated, power management circuit 120 includes a power state machine 130, cache invalidation information 140, and TLB invalidation information 150. In some embodiments, processing unit 100 is implemented differently than shown. For example, a portion or all of power management circuit 120 may be located in a corresponding processor core 110.

Processing unit 100, in various embodiments, is a central processing unit included in a computer system (not shown), such as a desktop system, a mobile device, a server system, etc. In some embodiments, processing unit 100 may correspond to another type of processing unit, such as a graphics processing unit. While processing unit 100 is shown as having two processor cores 110, processing unit 100 may have any suitable number of processor cores 110 (e.g., four processor cores 110). Also as shown, processing unit 100 interacts with an external fabric 118 that is configured to facilitate communication between processing unit 100 and various other elements of the computer system (e.g., a system memory, a graphics processing unit, etc.). For example, processor core 110A may retrieve, via external fabric 118, program instructions for execution from a memory (not shown) that is connected to external fabric 118. External fabric 118 may include various interconnects, buses, multiplexers, controllers, etc.

A processor core 110, in various embodiments, is hardware configured to retrieve and execute program instructions to implement various software routines. Accordingly, processor core 110A may retrieve, from a memory via external fabric 118, program instructions that are associated with a computer process and store the program instructions in entries of instruction cache 114. Instruction cache 114, in various embodiments, is a storage array that includes a set of entries configured to store program instructions. Instruction cache 114 may be an associative storage array (e.g., fully associative or set-associative, such as a 4-way associative cache) or a direct-mapped storage array. As processor core 110A proceeds through the execution path of a computer process, processor core 110A may retrieve program instructions from instruction cache 114 and execute them within execution complex 112. Execution complex 112, in various embodiments, is a set of hardware components, such as a control unit, an arithmetic logic unit, registers, etc., that facilitate the execution of program instructions.

For each entry of instruction cache 114, in various embodiments, instruction cache 114 includes a valid flag bit that indicates whether the corresponding stored program instruction is valid or invalid. Accordingly, when processor core 110A retrieves program instructions from memory and stores them in instruction cache 114, processor core 110A may set the associated bits to indicate that those program instructions are valid. Over time, processor core 110A may invalidate entries of instruction cache 114 (e.g., by setting the corresponding flags to indicate that those entries are invalid) and evict the corresponding program instructions from instruction cache 114. Processor core 110A may retrieve additional program instructions from memory to replace those program instructions that were invalidated and evicted.

For example, if a processor core 110 modifies a memory location that stores a program instruction, then the processor core 110 may notify the other processor cores 110 of processing unit 100 about the modification. Accordingly, processor core 110A may receive invalidation requests 115 from processor core 110B that indicate memory locations that have been modified by processor core 110B. In some cases, a component that is external to processing unit 100, such as a graphics processing unit (GPU), may modify a memory location that stores a program instruction, which may be cached in instruction cache 114. The external component may issue invalidation requests 115, to processor cores 110 via external fabric 118, that notify those cores about the modification.

In various embodiments, invalidation requests 115 can be routed indirectly to processor cores 110 through other components. In the illustrated embodiment, power management circuit 120 receives invalidation requests 115 that are directed to processor core 110A. In some cases, invalidation requests 115 may be sent from a processor core 110 to an L2 cache that distributes those invalidation requests 115 to components (e.g., power management circuit 120, processor core 110A, etc.) of processing unit 100. In other cases, invalidation requests 115 may not pass through an L2 cache, but instead are sent directly from an issuing processor core 110 to power management circuit 120. While processor core 110A is in a blocked state, the L2 cache may send invalidation requests 115 that are directed to processor core 110A to power management circuit 120 but not to processor core 110A. Based on invalidation requests 115, power management circuit 120 may cause one or more entries of instruction cache 114 to be invalidated and the corresponding program instructions evicted.

As shown, processor core 110A includes TLB 116. TLB 116, in various embodiments, is a storage array that includes a set of entries configured to store translations between virtual memory addresses and physical memory addresses. If a virtual memory address is referenced by a computer application and processor core 110A wishes to access corresponding data from memory (e.g., random-access memory), processor core 110A may translate the virtual memory address to a physical memory address that identifies the actual location of the data in memory. In order to perform translations more efficiently, processor core 110A may cache translations in TLB 116 and access them to perform corresponding translations. Similar to instruction cache 114, over time, processor core 110A may invalidate entries of TLB 116 (e.g., by setting flags to indicate that those entries are invalid) and evict the corresponding translations from TLB 116. In various cases, another component (e.g., processor core 110B) may change the location of data and, as a result, the corresponding physical memory address. The component may issue invalidation requests 115, to processor cores 110, that notify them about the change. Based on received invalidation requests 115, one or more entries of TLB 116 may be invalidated and the corresponding translations evicted. Processor core 110A may retrieve additional translation to replace those translations that were invalidated and evicted.

Power management circuit 120 manages the power of processor core 110A. In various embodiments, to perform power management, power management circuit 120 may implement hardcoded logic (e.g., state machines), circuitry that executes instructions (e.g., firmware or software instructions), or a combination of these. In various embodiments, power management circuit 120 is configured to power gate processor core 110A in response to the occurrence of various events. For example, power management circuit 120 may receive a wait-for-interrupt instruction that might be issued by processor core 110A upon completing the execution of its active program instructions. Power management circuit 120, in various embodiments, includes a power state machine 130 that manages processor core 110A's power gating sequence.

Power state machine 130, in various embodiments, facilitates the transition of a processor core 110 through various stages of a power gating sequence, including the management of that processor core 110 at those stages. As discussed in greater detail with respect to FIG. 3, power state machine 130 can transition processor core 110A from a run state in which the core can execute program instructions to an idle state in which the core is halted and does not actively execute program instructions.

While in the idle state, invalidation requests 115 directed to processor core 110A may be blocked from reaching processor core 110A. As a result, in various embodiments, processor core 110A does not perform, while it is in the idle state, maintenance operations on instruction cache 114 or TLB 116 to invalidate those entries whose data might be incorrect due to changes made by another component (e.g., processor core 110B). To ensure coherency before processor core 110A starts operating in the run state, in various embodiments, power management circuit 120 maintains cache invalidation information 140 and TLB invalidation information 150 based on invalidation requests 115 that are received while processor core 110A is in the idle state (or another blocked state, such as a powered-off state). Invalidation requests 115 may indicate one or more memory addresses to be invalidated (if stored) in instruction cache 114 and TLB 116. In various embodiments, cache invalidation information 140 and TLB invalidation information 150 identify the one or more memory addresses indicated by invalidation requests 115.

In various cases, power management circuit 120 may receive an indication to wake up processor core 110A by transitioning it to the run state. Prior to processor core 110A operating in the run state, power management circuit 120 may interact with processor core 110A in order to invalidate entries of instruction cache 114 and TLB 116 that are identified based on cache invalidation information 140 and TLB invalidation information 150. Accordingly, coherency of instruction cache 114 and TLB 116 is maintained. After invalidating any identified entries, power state machine 130 may complete the transition of processor core 110A to the run state such that processor core 110 starts to retrieve and execute program instructions.

Figure 2:
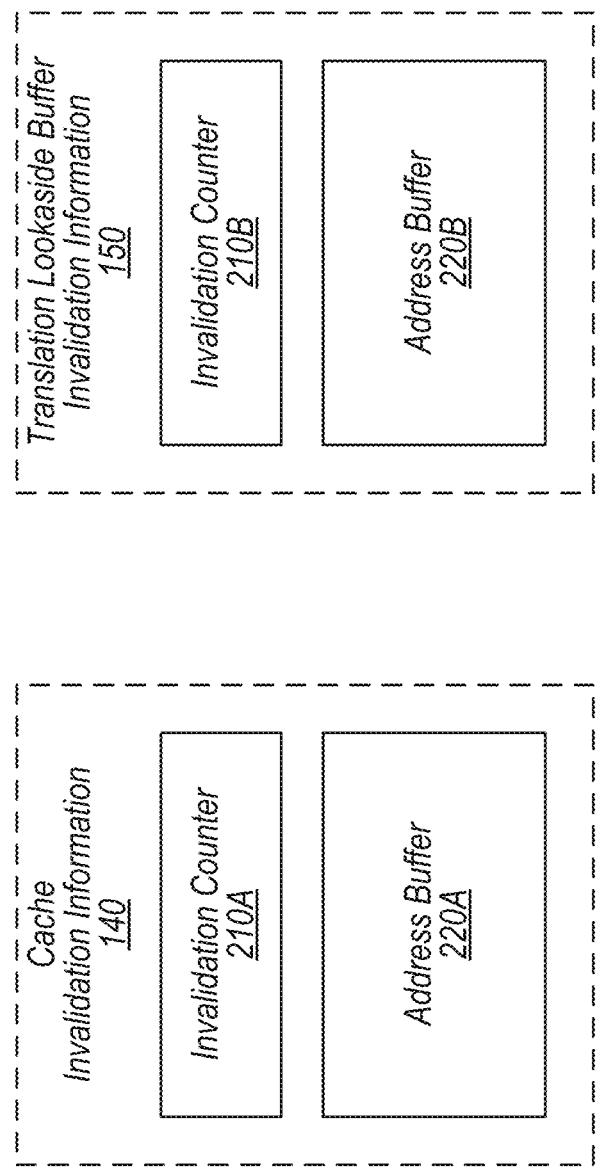
FIG. 2 is a block diagram illustrating example elements of cache invalidation information and TLB invalidation information, according to some embodiments.

Turning now to FIG. 2, a block diagram of an example way in which power management circuit 120 stores cache invalidation information 140 and TLB invalidation information 150 is shown. In the illustrated embodiment, power management circuit 120 includes an invalidation counter 210A and an address buffer 220A for cache invalidation information 140, and an invalidation counter 210B and an address buffer 220B for TLB invalidation information 150. While power management circuit 120 includes separate invalidation counters 210 and address buffers 220 in the illustrated embodiment, in some embodiments, power management circuit 120 includes a single invalidation counter 210 and address buffer 220 that store both cache and TLB invalidation information 140 and 150. In some embodiments, cache and TLB invalidation information 140 and 150 can be stored and/or represented differently than shown. For example, power management circuit 120 may include a single bit for cache invalidation information 140 that indicates whether at least one invalidation request 115 has been received.

An invalidation counter 210, in various embodiments, tracks the number of invalidation requests 115 for a particular storage array that are received at power management circuit 120 since that invalidation counter 210 was last reset. For example, after receiving an invalidation request 115 directed to processor core 110A for potentially invalidating an entry of instruction cache 114, power management circuit 120 may increment a value of invalidation counter 210A to account for that invalidation request 115. If a single invalidation counter 210 is used to track invalidation requests 115 for both instruction cache 114 and TLB 116, then power management circuit 120 may update the single counter 210 in response to receiving requests that are directed to either instruction cache 114 or TLB 116.

Figure 3:
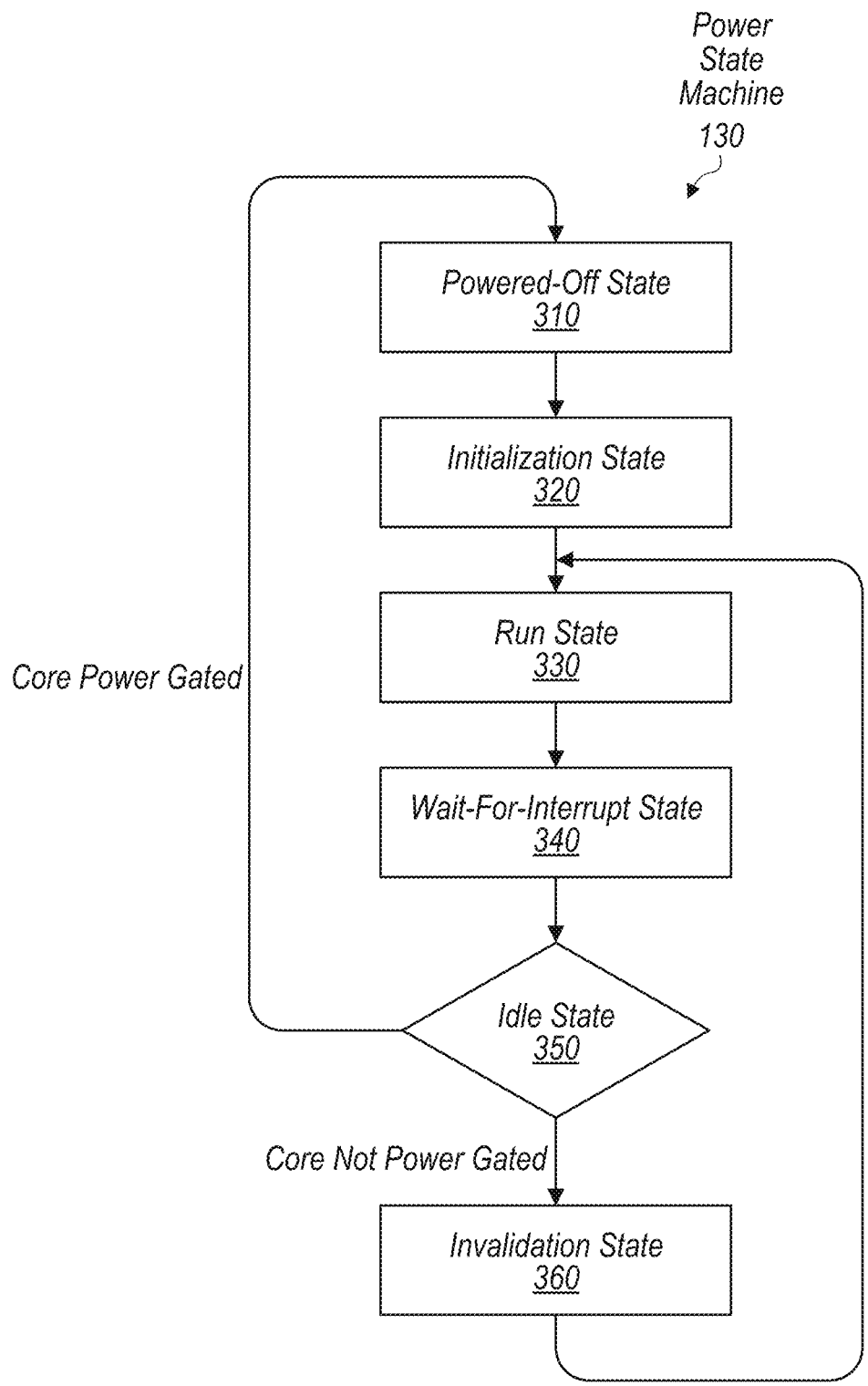
FIG. 3 is a block diagram illustrating example elements of a power state machine having an invalidation state, according to some embodiments.

In various embodiments, power management circuit 120 resets invalidation counters 210A and 210B in response to processor core 110A transitioning away from a run state (which is discussed in greater detail with respect to FIG. 3). For example, power management circuit 120 may transition processor core 110A into a wait-for-interrupt state (discussed below) during which various elements (e.g., a data cache) of processor core 110A are flushed or reset. While processor core 110A is in the wait-for-interrupt state, power management circuit 120 may reset invalidation counters 210A and 210B. In some embodiments, power management circuit 120 resets those invalidation counters 210 at another state of power state machine 130, such as the idle state.

While processor core 110A is in a blocked state (e.g., the idle state or the powered-off state), in various embodiments, power management circuit 120 updates invalidation counters 210A and 210B in response to receiving invalidation requests 115 as mentioned. In response to an invalidation counter 210 reaching or passing a threshold value, power management circuit 120 may set an overflow indicator. In various embodiments, the threshold value corresponds to the number of entries included in the associated address buffer 220. As an example, address buffer 220B may include eight entries for storing eight memory addresses. Accordingly, upon receiving nine invalidation requests 115 directed to TLB 116, power management circuit 120 may set the overflow indicator included in TLB invalidation information 150 as the number of invalidation requests 115 exceeds the storage capacity of address buffer 220B as indicated by invalidation counter 210B passing a threshold value of eight. Based on the overflow indicator being set in relation to its corresponding storage array (e.g., instruction cache 114), in various embodiments, power management circuit 120 invalidates all the entries of the storage array. In various cases, the overflow indicator for instruction cache 114 may be set while the overflow indicator for TLB 116 is not set (or vice versa). Accordingly, all the entries of instruction cache 114 may be invalidated while only a subset of entries of TLB 116 are invalidated based on TLB invalidation information 150.

An address buffer 220, in various embodiments, is a storage array having one or more entries that are configured to store memory addresses. As mentioned, an invalidation request 115 may specify a memory address whose corresponding data is to be invalidated. In various embodiments, power management circuit 120 stores, in the corresponding address buffer 220, the memory addresses that are identified by received invalidation requests 115. For example, power management circuit 120 may receive an invalidation request 115 directed to instruction cache 114. Accordingly, power management circuit 120 may store, in address buffer 220A, the memory address identified by that invalidation request 115. In some embodiments, one address buffer 220 is used to store memory addresses associated with instruction cache 114 and TLB 116. As such, that address buffer 220 may include additional information (e.g., a flag) for each entry that indicates to which storage array (e.g., instruction cache 114) that the corresponding stored memory address is directed.

Instead of invalidation counters 210 and/or address buffers 220, in some embodiments, cache invalidation information 140 and TLB invalidation information 150 may each correspond to a single respective flag that can be set in response to power management circuit 120 receiving at least one invalidation request 115 directed to the corresponding storage array. Based on the flag being set for a storage array, power management circuit 120 may invalidate all the entries of that storage array. Accordingly, in cases in which no invalidation requests 115 are directed to a particular storage array while a processor core 110 is in a blocked state, the entries of that particular storage array may be preserved. In some embodiments, power management circuit includes an override circuit having a debug value that can be used for debugging purposes. In response to the debug value being set, the power management circuit may invalidate all entries of the corresponding storage array prior to a processor core 110 operating in the run state.

Turning now to FIG. 3, a block diagram of an example power state machine 130 is shown. In the illustrated embodiment, power state machine 130 includes a powered-off state 310, an initialization state 320, a run state 330, a wait-for-interrupt state 340, an idle state 350, and an invalidation state 360. As shown, power state machine 130 includes two transition paths from idle state 350: one path in which processor core 110A is power gated and transitioned to powered-off state 310, and another path in which processor core 110A is not power gated and is transitioned to invalidation state 360. In some embodiments, power state machine 130 is implemented differently than shown. For example, as shown FIG. 4, processor core 110A can transition from powered-off state 310 to invalidation state 360 and then to initialization state 320.

Powered-off state 310, in various embodiments, represents a state in which a processor core 110 is powered off or powered up but held in a halted state (e.g., a portion of the core 110 receives power, such as instruction cache 114 when retention is supported). A processor core 110 may be transitioned to powered-off state 310 if that processor core 110 is not performing work or is not expected to perform work in the near future. As discussed in greater detail with respect to FIG. 4, if retention is supported, then power management circuit 120 may collect cache invalidation information 140 and TLB invalidation information 150 while processor core 110A is in powered-off state 310. In some cases, retention may not be supported and, as such, instruction cache 114 and TLB 116 are reset when processor core 110A enters powered-off state 310. Power management circuit 120 may transition processor core 110A from powered-off state 310 to initialization state 320 in response to receiving a request to wake up processor core 110A.

Initialization state 320, in various embodiments, represents a state in which storage arrays and registers of a processor core 110 are initialized. As an example, during initialization state 320, L1 and L2 caches associated with processor core 110A may be initialized with data in preparation for processor core 110A resuming normal execution. In various embodiments, power management circuit 120 transitions processor core 110A from initialization state 320 to run state 330 after initializing the desired set of storage arrays and registers.

Run state 330, in various embodiments, represents a state in which a processor core 110 is allowed to actively fetch and execute instructions. During run state 330, processor core 110A may fetch program instructions from instruction cache 114 and execute them in order to implement various software routines, including user programs. Processor core 110A may also fetch translations from TLB 116 to perform translations between virtual addresses and physical addresses. In some cases, processor core 110A may execute an idle initiating instruction upon having executed all of its active instructions. In response, in various embodiments, power management circuit 120 transitions processor core 110A from run state 330 to wait-for-interrupt state 340.

Wait-for-interrupt (WFI) state 340, in various embodiments, represents a state in which various components are flushed/reset in preparation for power gating a processor core 110. As an example, while processor core 110A is in WFI state 340, an L1 data cache of processor core 110A may be flushed. Power management circuit 120 may reset invalidation counters 210 and flush address buffers 220 while processor core 110A is in WFI state 340. Power management circuit 120 may also handshake with an L2 cache manager associated with processor core 110A to block invalidation requests 115 from reaching processor core 110A. The L2 cache manager may notify power management circuit 120 about any invalidation requests 115 so that power management circuit 120 may store cache invalidation information 140 and TLB invalidation information 150. After resetting invalidation counters 210, flushing address buffers 220, and/or handshaking with the L2 cache manager to block requests 115, in various embodiments, power management circuit 120 transitions processor core 110A from WFI state 340 to idle state 350.

Idle state 350, in various embodiments, represents a state in which a processor core 110 is waiting to either be power gated or woken up by an event (e.g., an interrupt). While processor core 110A is in idle 350, in response to receiving invalidation requests 115, power management circuit 120 may increment the appropriate counters 210 and add addresses to the appropriate address buffers 220. In various cases, power management circuit 120 may receive invalidation requests 115 from the L2 cache manager that received them from other processor cores 110 or other components via external fabric 118. As illustrated, if a processor core 110 is power gated, that processor core 110 is transitioned to powered-off state 310. If processor core 110A does not include retention support, then all components of processor core 110A may be reset, including instruction cache 114 and TLB 116. In various embodiments, power management circuit 120 resets counters 210 and address buffers 220 as a part of transitioning processor core 110A from idle state 350 to powered-off state 310. Power management circuit 120 restarts from powered-off state 310, transitioning processor core 110A towards run state 330. If a processor core 110 is not power gated, but instead is being woken up in response to an event, then power management circuit 120 may transition processor core 110A from idle state 350 to invalidation state 360.

Invalidation state 360, in various embodiments, represents a state in which one or more entries of instruction cache 114 and TLB 116 may be invalidated based on cache invalidation information 140 and/or TLB invalidation information 150. Power management circuit 120, in various embodiments, handshakes with processor core 110A and removes the affected entries from instruction cache 114 and TLB 116. For example, if address buffer 220A stores a certain memory address derived from an invalidation request 115, then power management circuit 120 may cause processor core 110A to invalidate an entry of instruction cache 114 if it includes an entry corresponding to that memory address. If an overflow indicator has been set based on an invalidation counter 210, then power management circuit 120 may cause processor core 110A to invalidate all entries of the corresponding storage array. For example, if power management circuit 120 determines that an overflow has occurred in invalidation counter 210A, then power management circuit 120 may cause processor core 110A to invalidate all entries of instruction cache 114. After invalidating the affected entries, in various power management circuit 120 transitions processor core 110A from invalidation state 360 to run state 330. In some cases, power management circuit 120 may transition processor core 110A from invalidation state 360 to initialization state 320.

Figure 4:
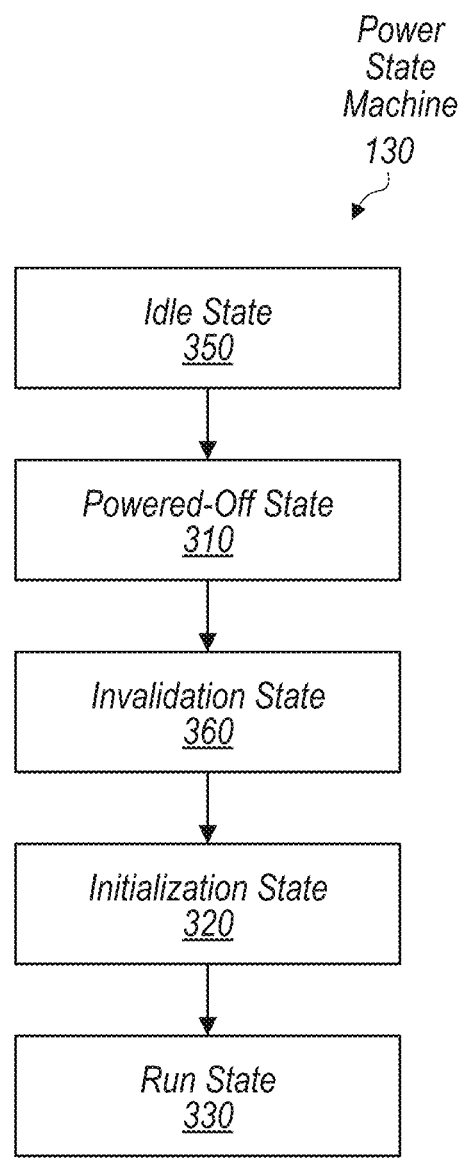
FIG. 4 is block diagram illustrating example elements of a retention-based power state machine having an invalidation state, according to some embodiments.

Turning now to FIG. 4, a block diagram of another example power state machine 130 is shown. In the illustrated embodiment, power state machine 130 includes powered-off state 310, initialization state 320, run state 330, idle state 350, and invalidation state 360. In FIG. 3, power state machine 130 includes a transition path from idle state 350 to powered-off state 310 that occurs when a processor core 110 is power gated. In some embodiments, processor core 110A supports "retention" in which instruction cache 114 and TLB 116 retain their data even when processor core 110A is power gated. As such, power state machine 130 of FIG. 4 may represent an alternative transition path that occurs when a processor core 110 is power gated if retention is supported. In some cases, power state machine 130 may be implemented differently than shown. For example, initialization state 320 may occur before invalidation state 360.

As before, when processor core 110A is power gated, power management circuit 120 transitions processor core 110A from idle state 350 to powered-off state 310. During powered-off state 310, power management circuit 120 may continue to receive invalidation requests 115 that are directed to processor core 110A and may increment the appropriate counters 210 and add addresses to the appropriate address buffers 220 based on those invalidation requests 115. Since instruction cache 114 and TLB 116 support retention in the illustrated embodiment, when processor core 110A is being woken up, power management circuit 120 transitions processor core 110A from powered-off state 310 to invalidation state 360. As before, during invalidation state 360, any affected entries of instruction cache 114 and TLB 116 are invalidated and if an overflow indicator is set, then all entries of the corresponding storage array are invalidated. Power management circuit 120 may then continue to transition processor core 110A towards run state 330.

Figure 5:
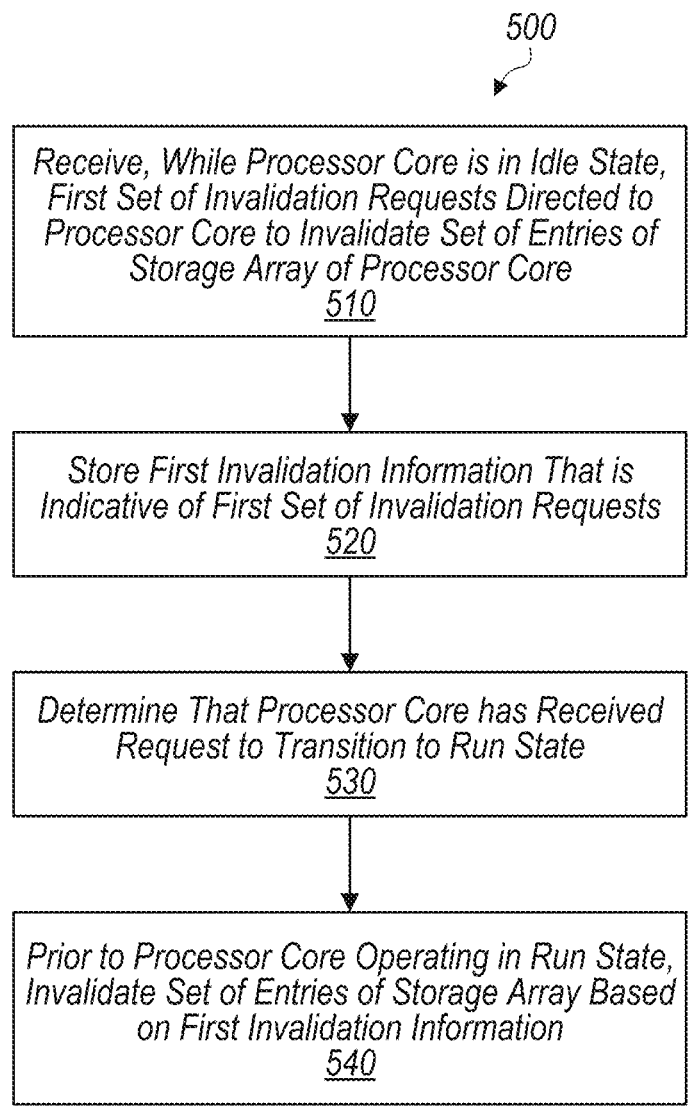
FIG. 5 is a flow diagram illustrating an example method relating to invalidating entries of a storage array of the processor, according to some embodiments.

Turning now to FIG. 5, a flow diagram of a method 500 is shown. Method 500 is one embodiment of a method performed by a processing unit (e.g., a processing unit 100) in order to invalidate entries of a storage array (e.g., an instruction cache 114) after, e.g., entering an idle state (e.g., idle state 350). In some cases, method 500 may be partially or totally performed by executing program instructions stored on a non-transitory computer-readable medium. In some embodiments, method 500 includes more or less steps than shown. For example, method 500 may include a step in which, after invalidating the set of entries of the storage array, the processing unit transitions a processor core (e.g., a processor core 110) to a run state (e.g., run state 330)

Method 500 begins in step 510 with the processing unit receiving, while the processor core is in the idle state, a first set of invalidation requests (e.g., requests 115) directed to the processor core to invalidate a set of entries of a storage array of the processor core. In some embodiments, the processing unit includes an invalidation counter (e.g., an invalidation counter 210) and increments a value of the invalidation counter in response to receiving a given one of the first set of invalidation requests directed to the processor core. The processing unit may detect that the processor core is to transition to the idle state and subsequently reset the value of the invalidation counter in response to that detection.

In step 520, the processing unit stores first invalidation information (e.g., cache invalidation information 140) that is indicative of the first set of invalidation requests. In some embodiments, the processing unit includes an invalidation buffer (e.g., an address buffer 220) and stores the first invalidation information in the invalidation buffer. The first invalidation information may specify a set of memory addresses. Accordingly, the set of entries that are invalidated may correspond to those entries of the storage array that store data for respective ones of the set of memory addresses.

In step 530, the processing unit determines that the processor core has received a request to transition to the run state. In some embodiments, the storage array is an instruction cache configured to store one or more instructions that are retrievable by the processor core for execution while operating in the run state.

In step 540, the prior to the processor core operating in the run state, the processing unit invalidates the set of entries of the storage array based on the first invalidation information. In some cases, the processing unit may determine that an overflow has occurred in the invalidation counter and in response to determining that the overflow condition has occurred, invalidate all entries of the storage array prior to the processor core operating in the run state.

In some embodiments, the processing unit receives, while the processor core is in the idle state, a second set of invalidation requests directed to the processor core to invalidate a set of entries of a translation lookaside buffer (TLB) (e.g., a TLB 116) of the processor core. The processing unit may stores second invalidation information (e.g., TLB invalidation information 150) indicative of the second set of invalidation requests. Prior to the processor core operating in the run state, the processing unit may invalidate the set of entries of the TLB based on the second invalidation information.

In some cases, the power management circuit many detect that the processor core has transitioned to a powered-off state in which the processor core is power gated. While the processor core is in the powered-off state, the power management circuit may receive a second set of invalidation requests directed to the processor core to invalidate a second set of entries of the storage array of the processor core. The processor core may store second invalidation information that is indicative of the second set of invalidation requests. Prior to the processor core operating in the run state, the power management circuit may invalidate the second set of entries of the storage array based on the second invalidation information.

Figure 6:
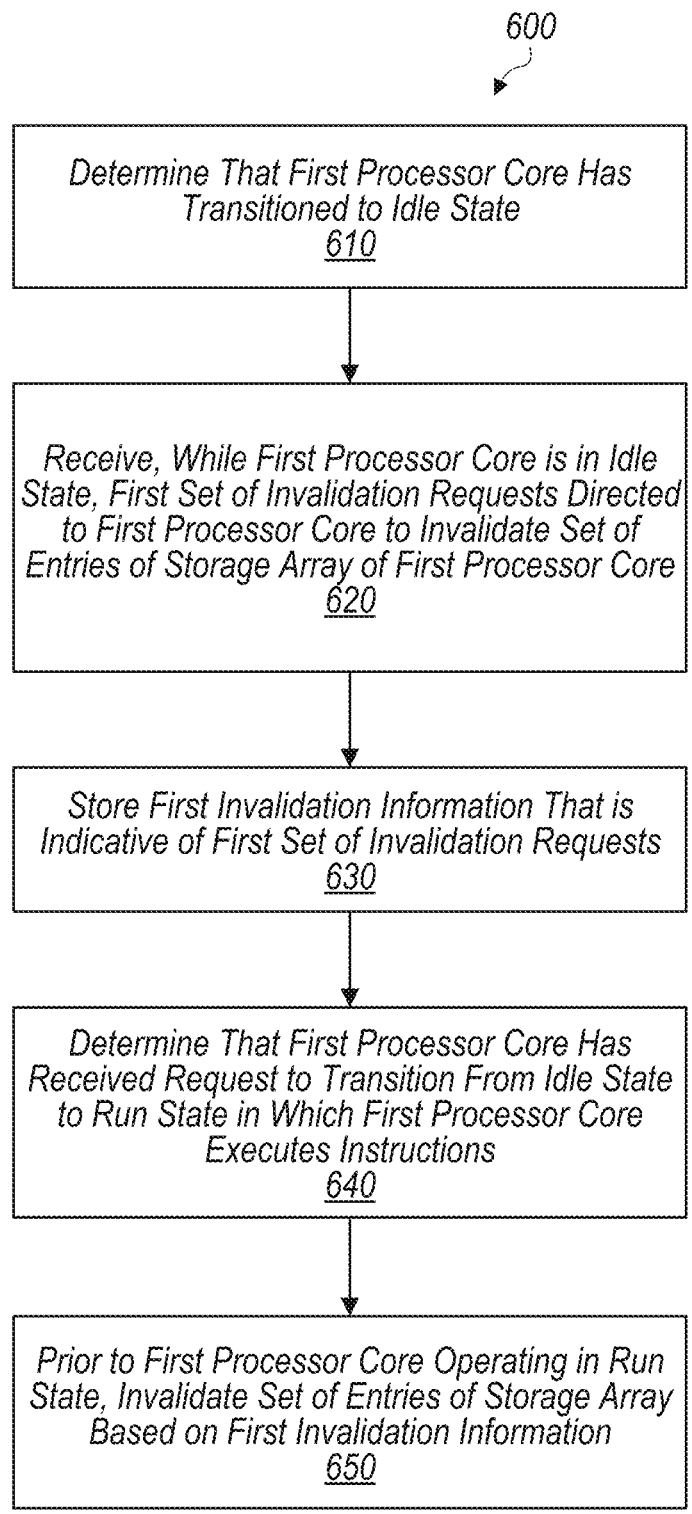
FIG. 6 is a flow diagram illustrating another example method relating to invalidating entries of a storage array of the processor, according to some embodiments.

Turning now to FIG. 6, a flow diagram of a method 600 is shown. Method 600 is one embodiment of a method performed by a processing unit (e.g., a processing unit 100) in order to invalidate entries of a storage array (e.g., a TLB 116) after, e.g., entering an idle state (e.g., idle state 350). In some embodiments, method 600 includes more or less steps than shown. For example, method 600 may include a step in which, after invalidating the set of entries of the storage array, the processing unit transitions a processor core (e.g., processor core 110) to a run state (e.g., run state 330)

Method 600 begins in step 610 with the processing unit determining that the processor core has transitioned to the idle state. In step 620, the processing unit receives, while the processor core is in the idle state, a first set of invalidation requests (e.g., requests 115) directed to the processor core to invalidate a set of entries of a storage array of the processor core. In some embodiments, the processing unit includes a second processor core coupled to the former processor core. The second processor core may modify data stored in an entry of its TLB and issue an invalidation request directed to the former processor core to invalidate an entry of the storage array that stores the data.

In step 630, the processing unit stores first invalidation information (e.g., TLB invalidation information 150) that is indicative of the first set of invalidation requests. In some embodiments, the processing unit includes a first invalidation buffer (e.g., an address buffer 220) and stores the first invalidation information in the first invalidation buffer. The first invalidation information may specify a first set of memory addresses.

In step 640, the processing unit determines that the processor core has received a request to transition from the idle state to a run state in which the processor core executes instructions. In step 650, the prior to the processor core operating in the run state, the processing unit invalidates the set of entries of the storage array based on the first invalidation information. In some embodiments, the processing unit tracks a number of invalidation requests received and in response to the number of invalidation requests satisfying a threshold value, invalidate all entries of the storage array prior to the processor core operating in the run state. In some embodiments, the processing unit includes an override circuit that is configured to cause, in response to a debug value being set, the processing unit to invalidate all entries of the storage array prior to the processor core operating in the run state.

In some cases, the processing unit may receive, while the processor core is in the idle state, a second set of invalidation requests directed to the processor core to invalidate a set of entries of a cache (e.g., an instruction cache 114) of the processor core. The processing unit may store second invalidation information (e.g., cache invalidation information 140) indicative of the second set of invalidation requests. Prior to the processor core being in the run state, the processing unit may invalidate the set of entries of the cache based on the second invalidation information. In some embodiments, the processing unit includes a second, separate invalidation buffer and stores the second invalidation information in the second invalidation buffer. In some embodiments, the processing unit stores the first and second invalidation information in the same invalidation buffer. The first invalidation information may specify a first set of memory addresses and the second invalidation information may specify a second set of memory addresses. Accordingly, the invalidation buffer may store indications that the first set of memory addresses is associated with the storage array and the second set of memory addresses is associated with the cache.

Exemplary Computer System

Figure 7:
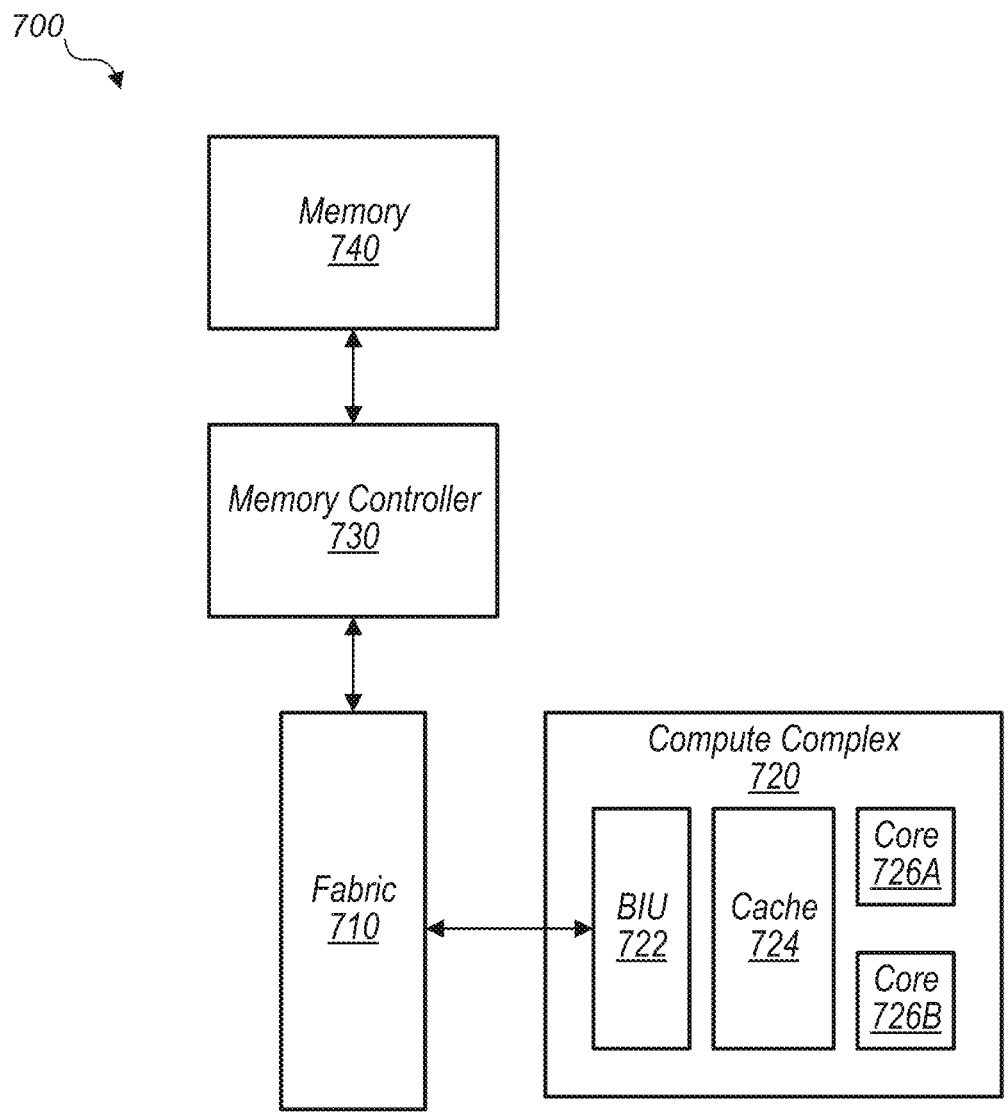
FIG. 7 is a block diagram illustrating an example computer system, according to some embodiments.

Turning now to FIG. 7, a block diagram illustrating an exemplary embodiment of a computer system 700 is shown. In some embodiments, elements of computer system 700 may be included within a system on a chip (SOC). In the illustrated embodiment, computer system 700 includes a fabric 710, a processor complex 720, a memory controller 730, and a memory 740. In various embodiments, computer system 700 also includes a graphics unit, a display unit, and various other components. Computer system 700 may be any of various types of systems, including, but not to be limited to, a server system, personal computer system, desktop computer, laptop or notebook computer, mainframe computer system, tablet computer, handheld computer, workstation, network computer, or consumer system such as a mobile phone, music player, or personal data assistant (PDA). Computer system 700 may implement various functionality by executing program instructions embodied in a non-transitory computer readable medium.

Fabric 710 may include various interconnects, buses, MUX's, controllers, etc., and may be configured to facilitate communication between various elements of computer system 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. As used herein, the term "coupled to" may indicate one or more connections between elements, and a coupling may include intervening elements. For example, in FIG. 7, compute complex 720 may be described as "coupled to" memory 740 through fabric 710 and memory controller 730.

In the illustrated embodiment, processor complex 720 includes bus interface unit (BIU) 722, cache 724, and cores 726A and 726B (e.g., processor cores 110A and 110B). In various embodiments, processor complex 720 may include various numbers of processors, processor cores and/or caches. For example, processor complex 720 may include 1, 2, or 4 processor cores, or any other suitable number. In one embodiment, cache 724 is a set associative L2 cache. In some embodiments, cores 726A and/or 726B may include internal instruction and/or data caches (e.g., instruction cache 114). In some embodiments, a coherency unit (not shown) in fabric 710, cache 724, or elsewhere in computer system 700 may be configured to maintain coherency between various caches of computer system 700. BIU 722 may be configured to manage communication between processor complex 720 and other elements of computer system 700. Processor cores such as cores 726 may be configured to execute instructions of a particular instruction set architecture (ISA), which may include operating system instructions and user application instructions. These instructions may be stored in computer readable medium such as a memory coupled to memory controller 730 discussed below.

Memory controller 730 may be configured to manage transfer of data between fabric 710 and memory 740. Memory 740 coupled to controller 730 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RANI (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory 740 coupled to controller 730 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 720 to cause system 700 to perform functionality described herein.

Figure 8:
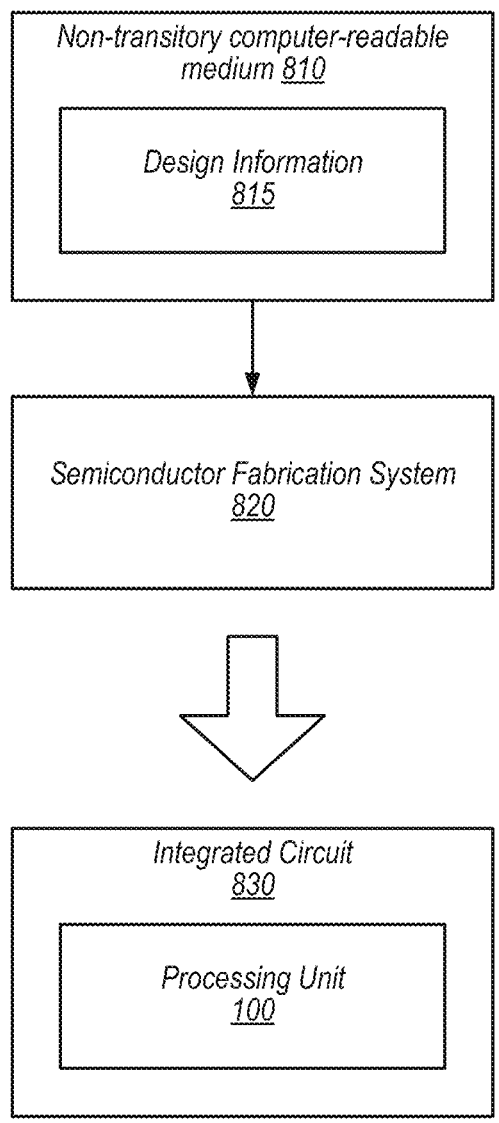
FIG. 8 is a block diagram illustrating an example process of fabricating at least a portion of a processing unit, according to some embodiments.

Turning now to FIG. 8, a block diagram illustrating an example process of fabricating at least a portion of a processing unit 100 is shown. The illustrated embodiment includes a non-transitory computer-readable medium 810, a semiconductor fabrication system 820, and a resulting fabricated integrated circuit 830. As further shown, non-transitory computer-readable medium 810 includes design information 815. In various embodiments, integrated circuit 830 additionally or alternatively includes other circuits described above, such as memory controller 730 and memory 740. In the illustrated embodiment, semiconductor fabrication system 820 is configured to process design information 815 and fabricate integrated circuit 830.

Non-transitory computer-readable medium 810 may include any of various appropriate types of memory devices or storage devices. For example, non-transitory computer-readable medium 810 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 810 may include two or more memory mediums, which may reside in different locations (e.g., in different computer systems that are connected over a network).

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries, which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit (e.g., integrated circuit 830). For example, design information 815 may specify circuit elements to be fabricated but not their physical layout. In this case, design information 815 may be combined with layout information to fabricate the specified integrated circuit.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements described with reference to FIGS. 1-4. Furthermore, integrated circuit 830 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 830 is performed. Design information 815 may be generated using one or more computer systems and stored in non-transitory computer-readable medium 810. The method may conclude when design information 815 is sent to semiconductor fabrication system 820 or prior to design information 815 being sent to semiconductor fabrication system 820. Accordingly, in some embodiments, the method may not include actions performed by semiconductor fabrication system 820. Design information 815 may be sent to semiconductor fabrication system 820 in a variety of ways. For example, design information 815 may be transmitted (e.g., via a transmission medium such as the Internet) from non-transitory computer-readable medium 810 to semiconductor fabrication system 820 (e.g., directly or indirectly). As another example, non-transitory computer-readable medium 810 may be sent to semiconductor fabrication system 820. In response to the method of initiating fabrication, semiconductor fabrication system 820 may fabricate integrated circuit 830 as discussed above.

Figure 9:
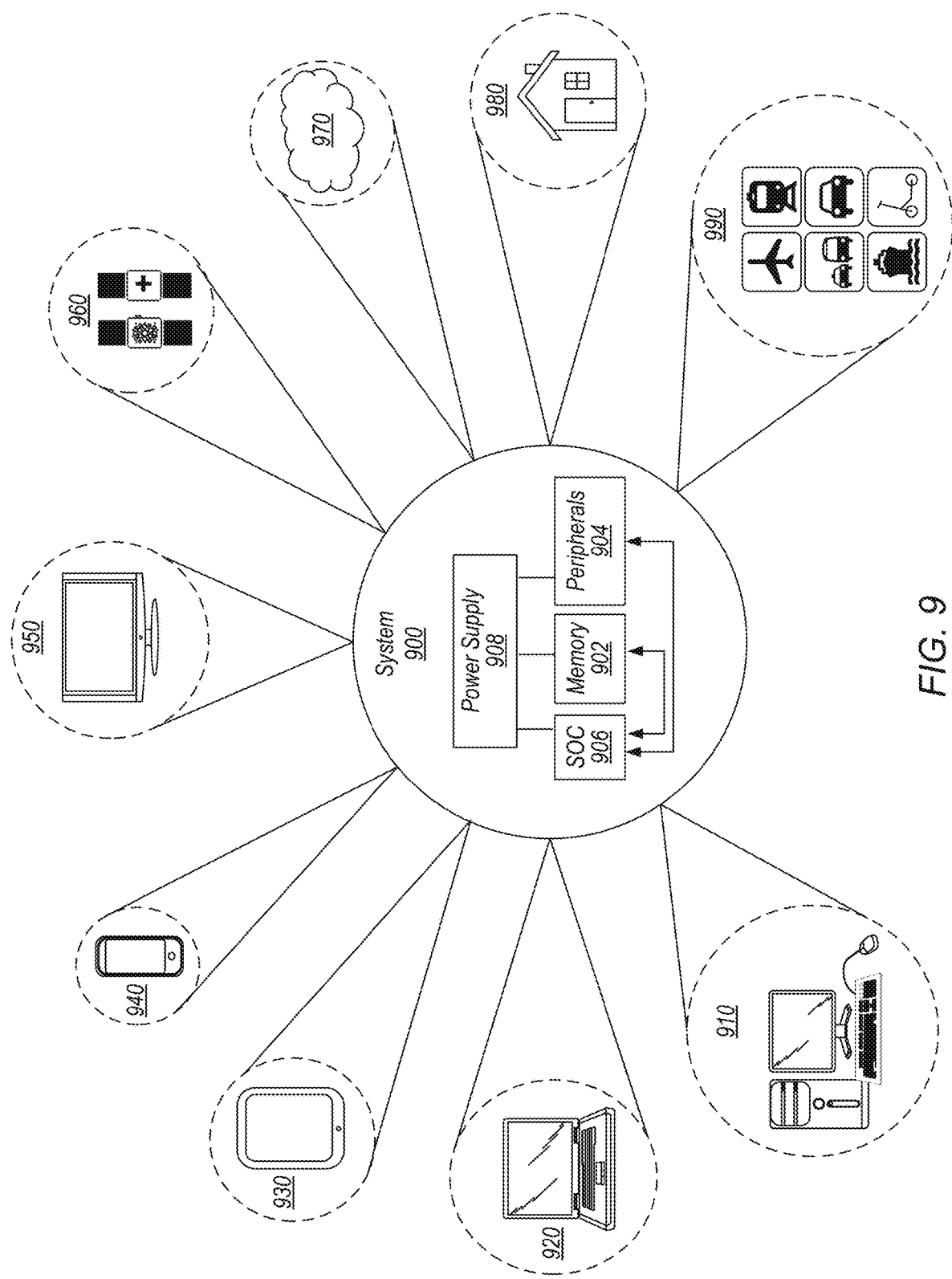
FIG. 9 is a block diagram illustrating an example system on a chip that is usable in various types of systems, according to some embodiments.

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units (e.g., processing unit 100), a communication fabric, and interfaces to memories and input/output devices. In some embodiments, one or more processors in SoC 906 includes multiple execution lanes and an instruction issue cache similar to processor cores 110. In various embodiments, SoC 906 (which may correspond to compute complex 720) is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (e.g., remotely located hardware and/or software resources). Still further, system 900 may be utilized in one or more devices of a home 980 other than those previously mentioned. For example, appliances within home 980 may monitor and detect conditions that warrant attention. For example, various devices within home 980 (e.g., a refrigerator, a cooling system, etc.) may monitor the status of the device and provide an alert to the homeowner (or, for example, a repair facility) should a particular event be detected. Alternatively, a thermostat may monitor the temperature in home 980 and may automate adjustments to a heating/cooling system based on a history of responses to various conditions by the homeowner. Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
 a processor core configured to:
  operate in an idle state in which the processor core does not execute instructions but is not in a powered-off state; and
  operate in a run state in which the processor core executes instructions;
 a cache circuit configured to send, to the processor core, invalidation requests directed to the processor core; and
 a power management circuit coupled to the processor core and the cache circuit, wherein the power management circuit includes an invalidation buffer and is configured to:
  transition the processor core from the run state to the idle state;
  communicate with the cache circuit to block invalidation requests associated with a storage array of the processor core from reaching the processor core;
  receive, from the cache circuit and while the processor core is in the idle state, a set of notifications about a first set of invalidation requests directed to the processor core to invalidate a set of entries of the storage array of the processor core;
  store, in the invalidation buffer, first invalidation information that is indicative of the first set of invalidation requests;
  based on a detection of a request to transition the processor core to the run state from the idle state, invalidate the set of entries of the storage array based on the first invalidation information; and
  based on a detection of a request to transition the processor core to the powered-off state from the idle state, discard the first invalidation information.

2. The system of claim 1, further comprising:
 an invalidation counter, wherein the power management circuit is configured to increment a value of the invalidation counter in response to receiving a notification about an invalidation request directed to the processor core.

3. The system of claim 2, wherein the power management circuit is configured to:
 determine that an overflow has occurred in the invalidation counter; and
 in response to determining that the overflow has occurred, invalidate all entries of the storage array prior to the processor core operating in the run state.

4. The system of claim 2, wherein the power management circuit is configured to:
 detect that the processor core is to transition to the idle state; and
 reset the value of the invalidation counter in response to detecting that the processor core is to transition to the idle state.

5. The system of claim 1, wherein the first invalidation information specifies a set of memory addresses, and wherein the set of entries correspond to those entries of the storage array that store data for respective ones of the set of memory addresses.

6. The system of claim 1, wherein the power management circuit is configured to:
 receive, while the processor core is in the idle state, another set of notifications about a second set of invalidation requests directed to the processor core to invalidate a set of entries of a translation lookaside buffer (TLB) of the processor core;
 store second invalidation information indicative of the second set of invalidation requests; and
 prior to the processor core operating in the run state, invalidate the set of entries of the TLB based on the second invalidation information.

7. The system of claim 1, wherein the storage array is an instruction cache configured to store one or more instructions that are retrievable by the processor core for execution.

8. The system of claim 1, wherein the power management circuit comprises:
 a power state machine configured to transition the processor core from the run state to the idle state.

9. The system of claim 1, wherein to discard the first invalidation information, the power management circuit is configured to:
 reset a value of an invalidation counter used to track a number of invalidation requests that is received while the processor core is in the idle state; and
 invalidate entries of the invalidation buffer that store a set of memory addresses identified by the first set of invalidation requests.

10. A non-transitory computer readable medium having stored thereon design information that specifies a circuit design in a format recognized by a fabrication system that is configured to use the design information to fabricate a hardware integrated circuit that comprises:
 a power management circuit that includes a first invalidation buffer and is configured to:
  transition a first processor core to an idle state in which the first processor core does not execute instructions but is not in a powered-off state;
  communicate with a cache circuit to block invalidation requests associated with a storage array of the first processor core from reaching the first processor core;
  receive, from the cache circuit and while the first processor core is in the idle state, a set of notifications about a first set of invalidation requests directed to the first processor core to invalidate a set of entries of the storage array of the first processor core;
  store, in the first invalidation buffer, first invalidation information that is indicative of the first set of invalidation requests;
  based on a detection of a request to transition the first processor core from the idle state to a run state in which the first processor core executes instructions, invalidate the set of entries of the storage array based on the first invalidation information; and
  based on a detection of a request to transition the first processor core from the idle state to the powered-off state, discard the first invalidation information.

11. The medium of claim 10, wherein the power management circuit is configured to:
 receive, while the first processor core is in the idle state, another set of notifications about a second set of invalidation requests directed to the first processor core to invalidate a set of entries of a cache of the first processor core;
 store second invalidation information indicative of the second set of invalidation requests; and
 prior to the first processor core being in the run state, invalidate the set of entries of the cache based on the second invalidation information.

12. The medium of claim 11, wherein the power management circuit includes:
a second, separate invalidation buffer, wherein the power management circuit is configured to store the second invalidation information in the second invalidation buffer.

13. The medium of claim 11, wherein the power management circuit is configured to store the first and second invalidation information in the first invalidation buffer, wherein the first invalidation information specifies a first set of memory addresses and the second invalidation information specifies a second set of memory addresses, and wherein the first invalidation buffer stores indications that the first set of memory addresses is associated with the storage array and the second set of memory addresses is associated with the cache.

14. The medium of claim 10, wherein the power management circuit is configured to:
track a number of notifications of invalidation requests received at the power management circuit; and
in response to the number of notifications satisfying a threshold value, invalidate all entries of the storage array prior to the first processor core operating in the run state.

15. The medium of claim 10, wherein the storage array is a first translation lookaside buffer (TLB), and wherein the hardware integrated circuit further comprises:
a second processor core coupled to the first processor core, wherein the second processor core is configured to:
modify data stored in an entry of a second TLB of the second processor core; and
in response to modifying the data, issue an invalidation request directed to the first processor core to invalidate an entry of the first TLB that stores the data.

16. The medium of claim 10, wherein the power management circuit is configured to:
after invalidating the set of entries of the storage array, transition the first processor core to the run state.

17. The medium of claim 10, wherein the power management circuit includes an override circuit that is configured to cause, in response to a debug value being set, the power management circuit to invalidate all entries of the storage array prior to the first processor core operating in the run state.

18. A method, comprising:
transitioning, by a power management circuit of an integrated circuit, a processor core of the integrated circuit to an idle state in which the processor core does not execute instructions but is not in a powered-off state;
communicating, by the power management circuit, with a cache circuit of the integrated circuit to block invalidation requests associated with a storage array of the processor core from reaching the processor core;
while the processor core is operating in the idle state, the power management circuit:
receiving, from the cache circuit, a set of notifications about a first set of invalidation requests directed to the processor core to invalidate a first set of entries of the storage array of the processor core; and
storing, in an invalidation buffer of the power management circuit, first invalidation information that is indicative of the first set of invalidation requests;
determining, by the power management circuit, that the processor core has received a request to transition to a run state in which the processor core executes instructions; and
prior to the processor core operating in the run state, the power management circuit invalidating the first set of entries of the storage array based on the first invalidation information, wherein the power management circuit is configured to discard the first invalidation information in response to a detection of a request to transition the processor core from the idle state to the powered-off state instead of the run state.

19. The method of claim 18, further comprising:
while the processor core is operating in the idle state, the power management circuit:
receiving another set of notifications about a second set of invalidation requests directed to the processor core to invalidate a set of entries of a translation lookaside buffer (TLB) of the processor core; and
storing second invalidation information that is indicative of the second set of invalidation requests; and
prior to the processor core operating in the run state, the power management circuit invalidating the set of entries of the TLB based on the second invalidation information.

* * * * *